Sept. 6, 1960      H. FEHR      2,951,956
MAGNETIC BRAKE

Filed May 21, 1956      2 Sheets-Sheet 1

Sept. 6, 1960 H. FEHR 2,951,956
MAGNETIC BRAKE
Filed May 21, 1956 2 Sheets-Sheet 2

United States Patent Office 2,951,956
Patented Sept. 6, 1960

2,951,956
MAGNETIC BRAKE

Henri Fehr, Montmorency, France, assignor to Société Anonyme dite: Compagnie de Construction Mecanique Procedes Sulzer, Paris, France Filed May 21, 1956, Ser. No. 585,991

Claims priority, application France May 24, 1955

1 Claim. (Cl. 310—93)

The present invention has for its object a magnetic brake, the method for carrying it out, being described herein, reference being had to the drawings, in which.

Figure 1:
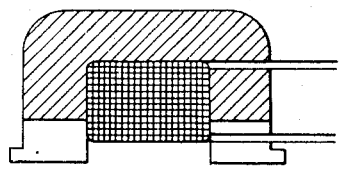
Fig. 1 to Fig. 4 are schematic views illustrating the operation of known magnetic brakes.
Figure 2:
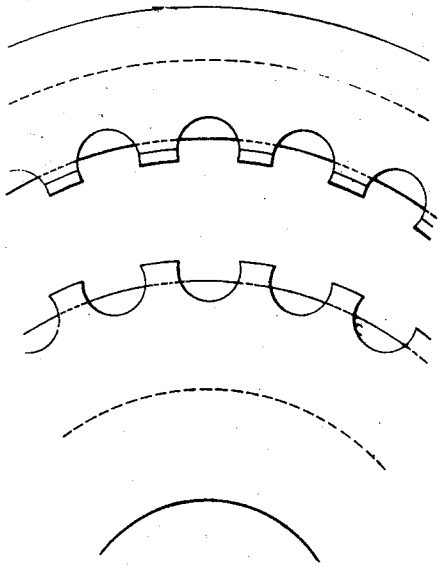

Homopolar magnetic brakes are already known wherein the massive, toothed-flanged (internal or external) stator encloses the revolution field coil (Fig. 1). The embedded teeth of the armature rotor (similar to the armature rotors of couplers) move past these stator teeth, there being as many rotor teeth as stator teeth, the rotor teeth having their ridges parallel or oblique with respect to the axis of rotation (Fig. 2).

Figure 3:
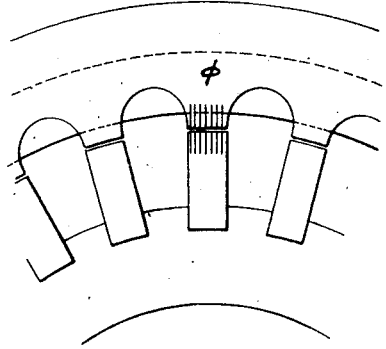
Figure 4:
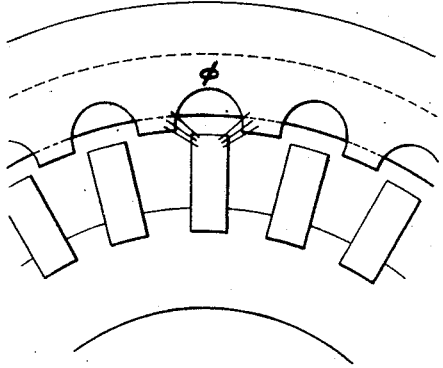

During the sweeping of the teeth the magnetic flux varies between two values, $\phi_{max}$ and $\phi_{min}$, $\phi_{max}$ when the mesial axes of the teeth are coincident with each other (Fig. 3), $\phi_{min}$ when the axis of one tooth is coincident with the axis of a clearance between adjacent teeth (Fig. 4).

The flux variations $\Delta\phi = \phi_{max} - \phi_{min}$ generate braking currents proportional to $\Delta\phi$.

Figure 5:
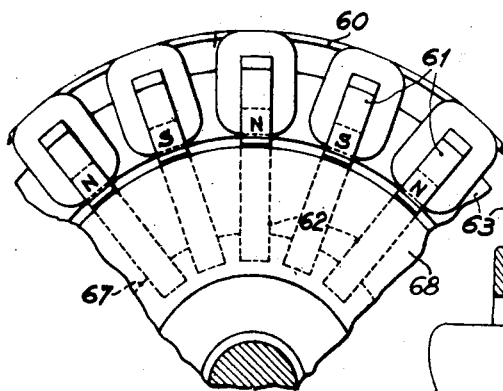
Fig. 5 is a partial profile view of a magnetic brake according to the invention.
Figure 6:
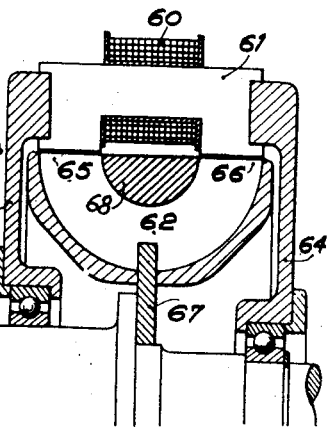
Fig. 6 is a longitudinal cross sectional view of a magnetic brake according to the invention.
Figure 7:
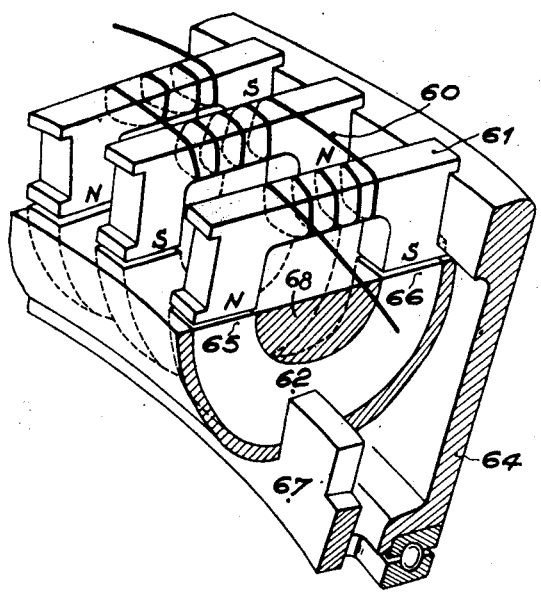
Fig. 7 is a partial perspective view of a magnetic brake according to the invention.

When it is necessary, for given dimensions and a predetermined field power, to increase the value of the progressive braking torque, another arrangement of the field stator can be selected; according to this invention the field stator is no more massive but consists of massive or lamellar separate magnetic cores 61 of same number as the magnetic cores 62 of the armature rotor 67, the end portions of the cores 62 forming teeth 65, 66. The stator cores 61 are regularly spaced along the periphery of two disks 63, 64 of non-magnetic metal acting as centering and supporting members, having separate windings 60 and their poles so arranged that the successive magnetic poles of a same face are alternately North and South poles (Figs. 5, 6 and 7).

The spaces between the teeth 65, 66 are filled with a good conductor non-magnetic metal 68 which surrounds the teeth 65, 66 and wherein are produced the eddy currents during the rotation as disclosed in the copending application filed by the same applicant on November 23, 1954. Serial No. 470,756, for "Synchronous Homopolar Magnetic Clutch."

During the rotation of the central disk 67 supporting the armature the braking-current generating flux variations are $$\Delta_1\phi = +\phi - (-\phi) = 2\phi$$

that is, considerably higher than in the case of a massive homopolar field.

Moreover, this arrangement permits a free circulation of the air between the magnetic cores and an improved dispersion of the heat developing during a braking operation.

This arrangement is also advantageous in that it permits a substantial reduction in the magnetic leakages originating in homopolar machines due to the existence of a privileged zone for the magnetic fields, which is the geometric axis of these machines.

The synchronous torque is maintained by reduced energization, a toroidal coil being advantageously used to this end, if desired.

In a magnetic brake of this character the armature rotor 67 rotating past the alternate North and South poles of the stator 61 generates a powerful braking torque for a given over-all volume, the limit-torque being the synchronizing torque.

What I claim is:

Hétéropolar electromagnetic brake comprising a field stator and an armature rotor, ferromagnetic cores carried by said armature rotor the end portions of which form two sets of teeth at the outer periphery of said armature rotor, said teeth being disposed symmetrically relative to the transverse median plane of the rotor, two teeth symmetrical with respect to said plane which consist of the end portions of a same ferromagnetic core, a non-magnetic metal having a good conductivity filling the gaps between the teeth and surrounding the latter whereby eddy currents are generated in this non-magnetic metal and these eddy currents reinforce the braking torque, the field stator comprising a plurality of massive magnetic cores, the number of said stator-forming cores being equal to that of said rotor cores, said stator cores having the shape of bars extending in an axial direction and having their pole-piece forming ends registering with said two sets of teeth of the rotor, and separate coil windings wound on said stator cores and each so polarized that the pole pieces registering with a same set of rotor teeth have alternate north and south polarities.

References Cited in the file of this patent

FOREIGN PATENTS

| | | |
|---|---|---|
| 64,301 | Switzerland | Mar. 7, 1913 |
| 510,718 | France | Sept. 10, 1920 |
| 925,414 | Germany | Mar. 21, 1955 |